2,905,636
Patented Sept. 22, 1959

2,905,636

MANUFACTURE AND USE OF SUPPORTED MOLYBDENUM-CONTAINING CATALYSTS

Charles H. Watkins, Arlington Heights, and Armand J. de Rosset, Clarendon Hills, Ill., assignors, by mesne assignments, to Universal Oil Products Company, Des Plaines, Ill., a corporation of Delaware No Drawing. Application June 27, 1957
Serial No. 668,342

15 Claims. (Cl. 208—216)

This application is a continuation-in-part of our copending application Serial No. 470,828, filed November 23, 1954, now abandoned, and relates to the manufacture of supported molybdenum-containing catalysts by a novel and improved method and to the use of such catalysts. More particularly, the present invention relates to an improvement in the manufacture of such catalysts by a critical interrelationship between the calcination temperatures used in the separate stages of catalyst preparation. As will be shown in the appended examples, these critical calcination temperatures surprisingly result in a catalyst of considerably improved effectiveness, both in the ability to effect the desired reactions and in a lower carbon deposition on the catalyst.

A particularly satisfactory catalyst for the purification of hydrocarbon distillates comprises a composite of alumina, molybdenum oxide and cobalt oxide. A preferred method of manufacturing this catalyst comprises forming the alumina into particles of definite size and shape, calcining the alumina, compositing the molybdenum component therewith, calcining the composite of alumina and molybdenum component, thereafter compositing the cobalt component, and finally calcining the resultant composite. We now have found that surprisingly improved benefits are obtained when the various calcinations are effected under different but critical temperature conditions.

In one embodiment the present invention relates to the method of preparing a catalyst comprising a solid support, molybdenum compound and an iron group compound, in which the molybdenum component and the iron group component are separately composited and in which separate calcination treatments are effected between each of the compositing steps, which comprises calcining the solid support in a first calcination step at a temperature which is higher than used in either of the two subsequent calcination steps and which is within the range of from about 1150° to about 1600° F., compositing a molybdenum compound with the thus calcined solid support, calcining the resultant composite in a second calcination step at a temperature which is lower than either of the other calcination steps and which is within the range of from about 400° to about 1050° F., thereafter compositing an iron group compound with said calcined composite, and calcining the resultant composite at a temperature which is higher than the second calcination temperature but lower than the first calcination temperature and which is within the range of from about 1050° to about 1400° F.

In a specific embodiment the present invention relates to the method of preparing an alumina-molybdenum oxide-cobalt oxide catalyst in which the molybdenum component is first composited with the alumina and then the cobalt component is composited therewith and in which separate calcination treatments are effected between each of the compositing steps, which comprises calcining alumina in a first calcination step at a temperature which is higher than used in either of the two subsequent calcination steps and which is within the range of from about 1150° to about 1400° F., compositing a molybdenum compound with the thus calcined alumina, calcining the resultant composite in a second calcination step at a temperature which is lower than either of the other calcination steps and which is within the range of from about 700° to about 900° F., thereafter compositing a cobalt compound with said calcined composite, and calcining the resultant composite at a temperature which is higher than the second calcination temperature but lower than the first calcination temperature and which is within the range of from about 1075° to about 1200° F.

In another embodiment the present invention relates to the conversion of hydrocarbons and particularly the purification of hydrocarbon distillates with a catalyst prepared in the manner herein set forth.

In accordance with the present invention, a solid support is formed into particles of definite size and shape. A particularly preferred support or carrier material is gamma- or other adsorptive alumina. Reference to alumina in the present specification and claims, therefore, will mean gamma- or other adsorptive alumina. Alpha-alumina, for example, is undesirable for this purpose and the use thereof is not contemplated in the present invention. The alumina may be of the gel type which generally is prepared by precipitation methods in which an alkaline material, including ammonium hydroxide, ammonium carbonate, etc., is commingled with an acidic salt of aluminum, including aluminum chloride, aluminum sulfate, aluminum nitrate, aluminum acetate, etc., or by commingling an acid, including sulfuric acid, nitric acid, hydrochloric acid, etc., with an alkaline salt of aluminum, including sodium aluminate, potassium aluminate, etc. In another embodiment, the alumina may comprise naturally occurring alumina including, for example, bauxite, diaspore, gibbsite, etc., which generally is activated by acid or other treatment, or alumina extracted from various clays by suitable treatment. When desired, the alumina may contain silica or other components which serve to stabilize the alumina. When silica is employed it may be present in a concentration of from about 1 to 12% or more by weight of the alumina and preferably within the range of from about 2 to about 10% by weight thereof. The silica, when employed, may be incorporated into the alumina in any suitable manner and, in a preferred embodiment, is incorporated into the alumina prior to calcination thereof in the manner to be hereinafter set forth. However, in some cases the silica may be incorporated after calcination or after compositing one or more of the other components with the alumina.

While alumina is a preferred support for use in accordance with the present invention, other suitable supports may be employed including, for example, silica, zirconia, thoria, magnesia, titania, zinc oxide, etc., or a combination of these or a combination of one or more of these with alumina. When utilized as a catalyst for effecting cracking of carbon to carbon bonds or other destructive reactions, the support preferably comprises a composite as, for example, silica-alumina, silica-zirconia, silica-alumina-zirconia, silica-magnesia, silica-alumina-magnesia, etc., in which the silica may comprise from about 30 to about 90% by weight of the composite. Other supports include alumina-titania, alumina-zirconia, alumina-zinc oxide, etc.

While reference to support is made in the present specification and claims, it is understood that the support may contribute to the activity of the catalyst, either by exerting an independent effect but more probably by a peculiar association with the other components of the catalyst to give a final catalyst of improved properties. In some cases, the support may comprise merely a carrying material and serves as an extended surface for the active catalytic components.

The alumina or other support is formed into particles of definite size and shape. In a preferred embodiment a suitable pelleting agent, including hydrogenated vegetable oils, graphite, etc., is commingled with alumina powder and then the alumina is formed into pellets of uniform size and shape. In another embodiment the alumina may be formed into the desired shape by extrusion, etc., or it may be utilized as a powder or granules of different size and shape.

In still another embodiment the alumina may be formed into spheroidal particles by dropping a sol into a water-immiscible suspending medium and forming firm gel particles therein or by spray-drying methods in which a slurry is sprayed into a heated zone and the wet particles dried by means of hot gases.

Regardless of the method of forming the alumina or other support and regardless of the particular size and shape thereof, the alumina is subjected to a calcination under critical temperature conditions. The specific temperatures are especially critical with pilled particles. Unless otherwise dried during preparation, the support usually is dried at a temperature of from about 200° to about 400° F. for a period of from about 1 to 10 hours or more before calcination.

In accordance with the present invention, the alumina or other support particles must be calcined at a temperature of at least about 1150° F. and generally within the range from about 1150° F. to about 1600° F. A particularly preferred temperature range is from about 1150° to about 1400° F. The calcination may be effected in any suitable atmosphere. Usually the calcination is effected in the presence of air or other oxidizing atmosphere although, in some cases, it may be effected in the presence of a reducing atmosphere, such as hydrogen, or in an inert atmosphere, such as nitrogen, methane, etc. While, in still other cases, two or more of such calcinations may be employed, at least one of which must be within the temperature range heretofore set forth. The time of calcination will vary with the particular support and the particular temperature of calcination. Generally the time of calcination will be within the range of from about 0.5 to 10 hours or more and preferably from about 0.75 at a relatively high temperature to about 8 hours at a relatively low temperature within the aforesaid temperature range. This high temperature calcination serves to activate the alumina and, in the case of pellets formed by pilling operations, serves to remove the pelleting agent, such as graphite, hydrogenated vegetable oil, etc.

After the alumina has been calcined in the manner herein set forth, it may be composited with the molybdenum or iron group component. Improved results appear to be obtained when the molybdenum component is first composited with the alumina and then the cobalt component composited therewith. The molybdenum component may be composited with the alumina, alumina-silica or other support in any suitable manner. In one embodiment, the molybdenum component is composited by utilizing an aqueous or ammoniacal solution of a suitable molybdenum compound, including molybdic acid, ammonium-paramolybdate, etc. While basic solutions of molybdenum are preferred, it is understood that, in some cases, acidic solutions thereof may be employed. In a preferred manner, the particles of alumina or other support are soaked, dipped, immersed, suspended, etc., in the solution of molybdenum compound, excess solution drained and the composite then dried and calcined. The concentration of the molybdenum solution generally will be controlled to introduce the desired amount of molybdenum component into the catalyst. In general, the concentration of molybdenum solution may range from 6 to 50 grams of molybdic acid (calculated as Mo) per 100 ml. of solution when a molybdenum oxide concentration within the range of from 3 to 25% by weight is desired in the final catalyst.

After the molybdenum component has been composited with the support, the composite usually is dried at a temperature of from about 200° to about 400° F. for a period of 1 to 10 hours or more prior to calcination. In accordance with the present invention, the composite is calcinated at a temperature not greater than about 1050° F. and usually within the range of from about 400° to about 1050° F. and preferably within the range of from about 700° to about 900° F. As hereinbefore set forth, it is important that this calcination temperature is lower than the other two calcination temperatures and must not exceed 1050° F. The exact time of calcination will depend upon the particular molybdenum compound used and upon the temperature of calcination. In general, the time of calcination will be within the range of from about 0.5 to 10 hours or more and preferably within the range of from about 0.75 to about 5 hours. The calcination may be effected in the presence of air or other oxidizing atmosphere although, in certain cases, it may be effected in the presence of a reducing or inert atmosphere or in a plurality of these but in no case should the temperature exceed about 1050° F. The calcination serves to activate the composition and to decompose the molybdenum salt, when used in the impregnating solution, into the desired oxide. When an oxide has been used originally or previously formed, for example, by reacting an alkaline precipitating agent with an acidic salt of molybdenum, the calcination serves to fix the oxide and thereby to prevent or reduce subsequent migration. During calcination the oxide may be converted into a different valence and/or combined chemically, physically and/or as a complex with the alumina or other support. It is understood that the above mechanisms are offered solely as a probable explanation for the improved results obtained and that applicants do not intend to be limited to these specific mechanisms.

The composite of alumina and molydenum compound may be composited with the iron group compound and particularly a cobalt compound in any suitable manner. In a preferred method, the alumina-molybdenum compound composite is soaked, dipped, immersed, suspended, etc., in a solution of a soluble cobalt compound, excess solution drained and the resultant composite dried and calcined. Cobalt nitrate is preferred as a source of cobalt. Other suitable salts of cobalt include cobalt ammonium nitrate, cobalt ammonium chloride, cobalt ammonium sulfate, cobalt bromate, cobalt bromide, cobalt chlorate, cobalt chloride, cobalt fluosilicate, cobalt iodide, cobalt potassium sulfate, etc. Here again the concentration of the cobalt solution will be controlled to give the amount of cobalt component desired in the final catalyst. For example, the impregnating solution may contain from 1 to 60 grams of cobalt component (calculated as Co) per 100 ml. of solution when the concentration of cobalt component in the final catalyst is within the range of from about 2 to 25% by weight.

While the cobalt component is preferred as hereinbefore set forth, other iron group components may be employed, either alone, as mixtures thereof or as mixtures thereof with the cobalt component. These other iron group components are composited in substantially the same manner as hereinbefore described for the cobalt component. Suitable salts of nickel include nickel ammonium nitrate, nickel ammonium sulfate, nickel bromide, nickel chloride, nickel fluosilicate, nickel iodide, nickel nitrate, nickel sulfate, etc. Soluble iron salts include iron ammonium sulfate, ferric bromide, ferrous bromide, ferric chloride, ferrous chloride, ferric nitrate, ferrous nitrate, etc. It is understood that the various salts or compounds of molybdenum, cobalt or other iron group metals which may be employed are not necessarily equivalent and also that the catalyst prepared from different components are not necessarily equivalent.

After the cobalt component has been composited, the resultant composite usually is dried at a temperature of from about 200° to about 400° F. for a period of from about 1 to 10 hours or more prior to calcination. In accordance with the present invention the final composite must be calcined at a temperature of at least about 1050° F. and generally within the range of from about 1050° to about 1400° F. and preferably within the range of from about 1075° to about 1200° F. This high temperature calcination serves to activate the catalyst and to fix the components. As will be shown by the examples appended to the present specifications, the catalysts calcined at a temperature within the range herein specified are unexpectedly superior to catalysts which have been calcined at a lower temperature.

The proportions of support, molybdenum component and cobalt or iron group components in the catalyst usually will depend upon the particular purpose for which the catalyst is to be used. In general, the molybdenum and cobalt components each will comprise from about 1 to about 25% by weight of the final catalyst and the support will comprise the remainder thereof. Preferred catalysts comprise those in which the molybdenum component (determined as Mo) is present in a concentration of from about 1 to about 12% and the cobalt (determined as Co) or other iron group component is present in a concentration of from about 0.5 to about 10% by weight. When the support comprises a mixture of two or more components, the total concentration thereof will be within the range hereinbefore set forth for the support.

In still another embodiment, the catalyst may contain halogen and preferably fluorine and/or chlorine. The halogen may be added in any suitable manner and at any suitable step of preparation. In a preferred embodiment, it is incorporated in the support prior to calcination thereof and is introduced as an aqueous solution of the corresponding hydrogen halide as, for example, aqueous hydrogen fluoride, hydrogen chloride, etc., or a mixture thereof. When employed, the halogen (calculated as free halogen) may be present in a concentration of from about 0.1 to 10% or more by weight of the final catalyst.

In still another embodiment the catalyst may be used in a sulfided form. After preparation in the manner hereinbefore set forth, the catalyst may be subjected to sulfidation by passing hydrogen sulfide or other suitable sulfur-containing compound therethrough, preferably at an elevated temperature which may range from about 500° to 1000° F. or more for a time sufficient to effect complete sulfidation, which may be determined by continuing the reaction until there is no further adsorption of hydrogen sulfide or other sulfur-containing compound. When the catalyst is utilized for the treatment or conversion of hydrocarbons or other organic fractions containing sulfur compounds, sulfidation may be effected in situ during use of the catalyst in the purification or conversion process.

The catalysts of the present invention are particularly suitable for the treatment of organic compounds and especially of hydrocarbons. Still more particularly these catalysts are of advantage for use in the treatment of gasoline or gasoline fractions containing undesirable impurities. The treatment of gasoline or gasoline fractions generally is effected in the presence of hydrogen at temperatures of from about 500° to about 800° F., although in some cases higher temperatures up to 850°–900° F. may be employed. Atmospheric and preferably superatmospheric pressures ranging from 50 to 5000 pounds per square inch or more may be utilized. This treatment will serve to remove impurities comprising sulfur, nitrogen, oxygen and arsenic from the gasoline or gasoline fractions, and thereby is particularly suitable for the treatment of gasoline or gasoline fractions prior to reforming of the gasoline in contact with a reforming catalyst containing a noble metal or expensive metal and particularly platinum in order to avoid the deleterious effects of these impurities on the reforming catalyst. Similarly, the catalyst of the present invention may be used for the treatment of other hydrocarbon fractions in order to remove undesirable impurities as, for example, the treatment of aromatic solvents, kerosene, stove oil, diesel fuel, gas oil, fuel oil, etc.

The catalyst of the present invention also may find utility for other conversion reactions of organic compounds and particularly hydrocarbons, including reforming of gasoline, dehydrogenation of normally gaseous or normally liquid hydrocarbons, isomerization of hydrocarbons, destructive hydrogenation of hydrocarbons to lower molecular weight compounds, hydrogen transfer reactions, alkyl transfer reactions, polymerization reactions, etc. Dehydrogenation and reforming reactions generally are effected at temperatures of from about 800° to 1200° F. or more, while non-destructive hydrogenation reactions generally are effected at temperatures of from about 300° to about 800° F. The various reactions hereinbefore set forth may be effected in the presence of hydrogen when required or of advantage.

While the catalyst of the present invention will have a relatively long life, it may be desirable to regenerate the same after long periods of service. Regeneration may be effected in any suitable manner, including, for example, passing air, oxygen, etc., either as such or diluted with inert gas, through the catalyst at a temperature sufficient to effect combustion of carbonaceous deposits from the catalyst and to oxidize the same. Usually it is preferred to control the regeneration temperature not to exceed about 1200° F. In some cases, it may be of advantage to precede or follow the oxidation with a reducing treatment by passing hydrogen or other reducing gas through the catalyst, preferably at an elevated temperature.

The various processes may be effected in any suitable manner including fixed bed type of operation in which the charge at the desired temperature and pressure is passed, either in upward or downward flow, through a reaction zone containing a fixed bed of catalyst disposed therein. When hydrogen is employed, it may be heated separately or with the charge and then passed into the reaction zone. Another type of operation is the fluidized system in which the charge and catalyst are maintained in a state of turbulence under hindered settling conditions in the reaction zone. Still another type of operation is the moving catalyst operation in which the charge is passed either concurrently or counter-currently to a moving bed of catalyst. Still another type of operation is the slurry or suspensoid type in which the catalyst is carried as a slurry or suspension into a reaction zone. Regardless of the particular process emyployed, the products are fractionated or otherwise separated into the treated or converted product and excess hydrogen which may be vented or recycled within the process. The hydrogen fraction may be treated to remove sulfur, ammonia, etc., prior to recycling. When cracking is effected, the lower boiling converted products may be separated from the higher boiling unconverted products and the later may be recycled within the process for further conversion therein.

The following examples are introduced to illustrate further the novelty and utility of the present invention but not with the intention of unduly limiting the same.

EXAMPLE I

A number of catalysts comprising alumina, about 6% by weight of molybdenum oxide (calculated as Mo) and about 3% by weight of cobalt oxide (calculated as Co) was prepared in substantially the same manner except for the temperature of calcination. Sterotex (a hydrogenated vegetable oil) was commingled with alumina powder and then the alumina was formed into pellets in a pilling machine, and the pellets then were calcined. The molybdenum was composited with the calcined alumina by soaking the pills in an ammoniacal solution of molybdic acid, draining excess solution, drying at about 300° F. and then calcining. After this calcination, the cobalt was composited by soaking the alumina-molybdenum oxide pills in a cobalt nitrate solution, draining excess solution, drying the pills at about 300° F. and calcining the final composite.

Generally this catalyst will effect desulfurization of hydrocarbon fractions readily but removal of nitrogen impurities in the hydrocarbon fractions is more difficult. For comparative purposes, a special blend of naphtha was prepared to contain 251 p.p.m. (parts per million) of quinoline as representative of basic nitrogen and 0.2% by weight of thiophene as representative of sulfur. The blend had an API gravity at 60° F. of 54.5. The decrease in basic nitrogen was determined and utilized as a criterion for evaluating the effectiveness of the various catalysts.

These runs were all made at an inlet temperature of about 700° F. and a pressure of about 800 pounds per square inch, utilizing hydrogen in a concentration of 500–600 cubic feet per barrel of oil.

Prior to compositing with the other components the alumina was calcined at a temperature of about 1240° F. It has been found that a temperature of at least 1150° F. is necessary in order to remove the Sterotex utilized as a pelleting agent. The catalysts reported in Table I below were subjected to a final calcination temperature, that is, after both the molybdenum and cobalt have been incorporated, of 1100° F. The variable in this example is the temperature of calcination after the molybdenum had been incorporated but before incorporating the cobalt.

*Table I*

| Calcination Temperature After Molybdenum But Before Cobalt Impregnation | Remaining Basic Nitrogen, p.p.m. |
|---|---|
| 400° F | 12 |
| 800° F | 8 |
| 1100° F | 22 |

The above results are the average of two successive runs each.

It will be noted that calcination of the composite of alumina and molybdenum component to a temperature of 1100° F. served to reduce the effectiveness of the catalyst in removing nitrogen from the charge. Surprisingly, calcination of the composite at this stage of the preparation at a lower temperature served to effect improved removal of nitrogen contaminants.

EXAMPLE II

This example illustrates the effect of final calcination temperature. The final calcination is effected after both the molybdenum and cobalt components have been composited with the alumina. The catalysts used in this example were prepared in the same manner as described in Example I. Another portion of the same charge as described in Example I was utilized in these runs, and the runs that were effected at the same conditions are reported in Example I.

In this example the variable is the final calcination temperature. The intermediate calcination of the alumina-molybdenum composite was effected at 800° F.

*Table II*

| Final Calcination Temperature | Remaining Basic Nitrogen, p.p.m. |
|---|---|
| 800° F | 17 |
| 1,100° F | 8 |

It will be noted that the second example in Table II is the same as the second example in Table I. More important it will be noted that, when the final calcination was effected at 800° F., the treated products had a basic nitrogen content of 17 p.p.m. On the other hand, when the calcination temperature was 1100° F., the basic nitrogen content was reduced to 8 p.p.m. These data clearly illustrate the improved results obtained by effecting the final calcination at a temperature of 1100° F. as compared to a lower temperature.

EXAMPLE III

This example is another comparison similar to that described in Example II. The catalyst, charge and treating conditions were the same as described in Example I except for the calcination variable. In this example the alumina-molybdenum composite was calcined at 400° F. and the final calcination was effected at temperatures shown in Table III.

*Table III*

| Final Calcination Temperature | Remaining Basic Nitrogen, p.p.m. |
|---|---|
| 800° F | 30 |
| 1,100° F | 12 |

It will be noted that the second example in Table III is the same as the first example in Table I. Here again, it will be noted that a final calcination temperature of 1100° F. gave considerably better nitrogen removal as compared to the run in which the lower final calcination temperature was utilized.

EXAMPLE IV

This example illustrates an example of a catalyst prepared in the manner embraced within the teachings of the prior art but not in accordance with the present invention. This catalyst comprised the same composition as discussed in Example I and was prepared in the same manner described therein except for the calcination temperatures. In this example, the alumina-molybdenum composite was calcined at 1100° F. and the final calcination, after cobalt impregnation, was effected at 800° F.

In a run with the same charge stock, conditions of operation and catalyst preparation (except for calcination temperatures) as described in the previous runs, the basic nitrogen content of the treated naphtha was 35 p.p.m. It will be noted that the nitrogen content of this treated naphtha is higher than in any of the previous runs and, in fact, is more than four times as much as the 8 p.p.m. obtained in the second example in Table I.

EXAMPLE V

A catalyst prepared by the general method and containing the same composition as described in Example I was utilized for the treatment of a California cracked naphtha at a temperature of about 700° F. and a pressure of about 800 pounds per square inch in the presence of about 3000 cubic feet of hydrogen per barrel of naphtha. Analysis of the charge and the results after about 67 hours of operation are reported in the following table. The alumina pills prior to compositing with the other components were calcined at 1240° F. After molybdenum impregnation, the composite was calcined at 800° F. The final calcination was effected at 1100° F.

*Table IV*

|  | Charge | Product |
|---|---|---|
| Sulfur, percent by weight | 1.29 | about 0.0008 |
| Bromine number | 77 | 0.4 |
| Basic nitrogen, p.p.m | 218 | 1 |

It will be noted from the above data that the catalyst prepared in accordance with the present invention was very effective for reducing the sulfur, nitrogen and unsaturation of the cracked naphtha.

EXAMPLE VI

A catalyst comprising alumina, 5% silica, 10% molybdenum oxide and 4% cobalt oxide is prepared as follows: The alumina-silica support is formed into pellets in a conventional manner and then calcined at a temperature of 1300° F. for two hours. The pills then are soaked in an ammoniacal solution of molybdic acid. Excess solution is drained and the pills are dried at 300° F. for three hours and calcined at 900° F. for one hour. The pills then are soaked in an aqueous solution of cobalt nitrate hexahydrate, excess solution drained, and the pills dried at 300° F. for three hours and finally calcined at 1150° F. for two hours.

The catalyst as prepared in the above manner is utilized for the reforming of a straight run naphtha at a temperature of 960° F. and a pressure of 700 pounds per square inch in the presence of hydrogen in a mol ratio of seven mols of hydrogen per mol of naphtha.

EXAMPLE VII

In addition to the surprisingly improved benefits obtained by the catalyst prepared in accordance with the present invention as illustrated, for example, in Example IV where basic nitrogen content was reduced to 8 p.p.m. as compared to 35 p.p.m. with a catalyst prepared according to the prior art teachings (an improvement of more than four times), the catalysts of the present invention surprisingly also result in considerably lower carbon deposition. This is illustrated in the following example.

In this example, two catalysts were separately prepared to comprise alumina, 10% by weight of molybdenum oxide and 3% by weight of nickel oxide. These catalysts were prepared by calcining alumina pills ("Filtrol") at different temperatures. In Catalyst A the calcination temperature was 932° F. (within the teaching of the prior art). In Catalyst B the calcination temperature was about 1150° F. (according to the teachings of the present invention). Each calcined alumina then was separately finished by impregnating with ammoniacal molybdic acid solution. Composite A was calcined at about 400° F. and Composite B was calcined at about 800° F. The alumina-molybdenum oxide composites then were separately impregnated with nickel carbonate in acetic acid solution, dried at 300° F. for three hours and finally calcined at 1112° F. for one hour.

Catalyst A and Catalyst B each were separately utilized for the treatment of a heavy cracked gasoline fraction boiling from about 290° to 400° F. and having a bromine number of 64.2 and a basic nitrogen content of 270 p.p.m. (parts per million). The results of these runs are shown in the following table:

*Table V*

|  | Charge | Product with Catalyst A | Product with Catalyst B |
|---|---|---|---|
| Basic Nitrogen, p.p.m. | 270 | 13.9 | 10.9 |
| Bromine Number | 64.2 | 7.62 | 6.35 |
| Percent Carbon on Catalyst |  | 1.21 | 0.92 |

In these particular runs, the liquid hourly space velocity was 4.2. While better nitrogen removal would be obtained at a lower space velocity, the data in the above example do illustrate that improved nitrogen removal (more than 21% improvement) is obtained and also that greater reduction in bromine number (more than 16% improvement) is obtained. Surprisingly, the carbon deposition on the catalyst is considerably lower with the improved catalyst of the present invention in spite of the fact that greater nitrogen removal and greater reduction in bromine number are obtained. These results are surprising and contrary to the usual results where higher carbon deposition normally occurs when greater reduction in nitrogen and bromine number are effected.

We claim as our invention:

1. In the method of preparing a catalyst comprising a solid support, molybdenum compound and an iron group compound in which the molybdenum component and the iron group component are separately composited, and in which a separate calcination treatment is effected after each of the compositing steps, the improvement which comprises calcining the solid support in a first calcination step at a temperature which is higher than used in either of the two subsequent calcination steps and which is within the range of from at least 1150° to about 1600° F., compositing a molybdenum compound with the thus calcined solid support, calcining the resultant composite in a second calcination step at a temperature which is lower than either of the other calcination steps and which is within the range of from about 400° to about 1050° F., thereafter compositing an iron group compound with said calcined composite, and calcining the resultant composite at a temperature which is higher than the second calcination temperature but lower than the first calcination temperature and which is within the range of from about 1050° to about 1400° F.

2. In the method of preparing a catalyst comprising alumina, molybdenum compound and cobalt compound, in which the molybdenum component is first composited with the alumina and then the cobalt component is composited therewith, and in which a separate calcination treatment is effected after each of the compositing steps, the improvement which comprises calcining alumina in a first calcination step at a temperature which is higher than used in either of the two subsequent calcination steps and which is within the range of from at least 1150° to about 1400° F., compositing a molybdenum compound with the thus calcined alumina, calcining the resultant composite in a second calcination step at a temperature which is lower than either of the other calcination steps and which is within the range of from about 700° to about 900° F., thereafter compositing a cobalt compound with said calcined composite, and calcining the resultant composite at a temperature which is higher than the second calcination temperature but lower than the first calcination temperature and which is within the range of from about 1075° to about 1200° F.

3. In the method of preparing a catalyst comprising a solid support, molybdenum compound and iron group compound, in which said solid support is formed into particles of definite size and shape and in which the molybdenum component is first composited with the solid support particles and then the iron group component is composited therewith and in which a separate calcination treatment is effected after each of the compositing steps, the improvement which comprises calcining the solid support particles in a first calcination step at a temperature which is higher than used in either of the two subsequent calcination steps and which is within the range of from at least 1150° to about 1600° F., compositing a molybdenum compound with the thus calcined solid support, calcining the resultant composite in a second calcination step at a temperature which is lower than either of the other calcination steps and which is within the range of from about 400° to about 1050° F., thereafter compositing an iron group compound with said calcined composite, and calcining the resultant composite at a temperature which is higher than the second calcination temperature but lower than the first calcination temperature and which is within the range of from about 1050° to about 1400° F.

4. In the method of preparing a catalyst comprising alumina, molybdenum compound and cobalt compound, in which said alumina is formed into particles of definite size and shape and in which the molybdenum component is first composited with the alumina particles and then the cobalt component is composited therewith and in which a separate calcination treatment is effected after each of the compositing steps, the improvement which comprises calcining the alumina particles in a first calcination step at a temperature which is higher than used in either of the two subsequent calcination steps and which is within the range of from at least 1150° to about 1400° F., compositing a molybdenum compound with the thus calcined alumina, calcining the resultant composite in a second calcination step at a temperature which is lower than either of the other calcination steps and which is within the range of from about 700° to about 900° F., thereafter compositing a cobalt compound with said calcined composite, and calcining the resultant composite at a temperature which is higher than the second calcination temperature but lower than the first calcination temperature and which is within the range of from about 1075° to about 1200° F.

5. The method of claim 4 further characterized in that silica is composited with said alumina prior to the first calcination step.

6. The method of claim 4 further characterized in that said catalyst is subjected to a sulfidation treatment prior to use.

7. In the method of preparing a catalyst comprising a solid support, molybdenum compound and an iron group compound, in which the molybdenum component is first composited with the solid support and then the iron group component is composited therewith, and in which a separate calcination treatment is effected after each of the compositing steps, the improvement which comprises compositing a molybdenum compound with a solid support which had been calcined at a temperature which is higher than used in either of the two calcination steps and which is within the range of from at least 1150° to about 1600° F., calcining the resultant composite of solid support and molybdenum compound in a separate calcination step at a temperature which is lower than either of the other calcination steps and which is in the range of from about 400° to about 1050° F., thereafter compositing an iron group compound with said calcined composite, and calcining the resultant composite at a temperature which is higher than the second mentioned calcination temperature but lower than the first mentioned calcination temperature and which is within the range of from about 1050° to about 1400° F.

8. In the method of preparing a catalyst comprising alumina, molybdenum compound and cobalt compound, in which the molybdenum component is first composited with the alumina and then the cobalt component is composited therewith, and in which a separate calcination treatment is effected after each of the compositing steps, the improvement which comprises compositing a molybdenum compound with alumina which had been calcined at a temperature which is higher than used in either of the two calcination steps and which is within the range of from at least 1150° to about 1400° F., calcining the resultant composite of alumina and molybdenum compound in a separate calcination step at a temperature which is lower than either of the other calcination steps and which is in the range of from about 700° to about 900° F., thereafter compositing a cobalt compound with said calcined composite, and calcining the resultant composite at a temperature which is higher than the second mentioned calcination temperature but lower than the first mentioned calcination temperature and which is within the range of from about 1075° to about 1200° F.

9. In the method of preparing a catalyst comprising alumina, molybdenum compound and cobalt compound, in which the molybdenum component is first composited with alumina and then the cobalt component is composited therewith, and in which a separate calcination treatment is effected after each of the compositing steps, the improvement which comprises compositing molybdic acid solution with alumina which had been calcined at a temperature which is higher than used in either of the two calcination steps and which is within the range of from at least 1150° to about 1400° F., calcining the resultant composite of alumina and molybdic acid in a separate calcination step at a temperature which is lower than either of the other calcination steps and which is in the range of from about 700° to about 900° F., thereafter compositing cobalt nitrate solution with said calcined composite, and calcining the resultant composite at a temperature which is higher than the second mentioned calcination temperature but lower than the first mentioned calcination temperature and which is within the range of from about 1075° to about 1200° F.

10. In the method of preparing a catalyst comprising alumina, molybdenum compound and nickel compound, in which the molybdenum component is first composited with the alumina and then the nickel component is composited therewith, and in which a separate calcination treatment is effected after each of the compositing steps, the improvement which comprises compositing a molybdenum compound with alumina which had been calcined at a temperature which is higher than used in either of the two calcination steps and which is within the range of from at least 1150° to about 1400° F., calcining the resultant composite of alumina and molybdenum compound in a separate calcination step at a temperature which is lower than either of the other calcination steps and which is in the range of from about 700° to about 900° F., thereafter compositing a nickel compound with said calcined composite, and calcining the resultant composite at a temperature which is higher than the second mentioned calcination temperature but lower than the first mentioned calcination temperature and which is within the range of from about 1075° to about 1200° F.

11. A process for the conversion of a hydrocarbon which comprises subjecting said hydrocarbon to contact at conversion conditions with a catalyst prepared by calcining a solid support in a first calcination step at a temperature which is higher than used in either of the two subsequent calcination steps hereinafter set forth and which is within the range of from at least 1150° to about 1600° F., compositing a molybdenum compound with the thus calcined solid support, calcining the resultant composite in a second calcination step at a temperature which is lower than either of the other calcination steps and which is within the range of from about 400° to about 1050° F., thereafter compositing an iron group compound with said calcined composite, and calcining the resultant composite at a temperature which is higher than the second calcination temperature but lower than the first calcination temperature and which is within the range of from about 1050° to about 1400° F.

12. A process for the treatment of a hydrocarbon distillate to remove sulfur and nitrogen contaminants therefrom which comprises contacting said distillate with hydrogen at a temperature of from about 500° to about 800° F. with a catalyst prepared by calcining alumina particles in a first calcination step at a temperature which is higher than used in either of the two subsequent calcination steps hereinafter set forth and which is within the range of from at least 1150° to about 1400° F., compositing a molybdenum compound with the thus calcined alumina particles, calcining the resultant composite in a second calcination step at a temperature which is lower than either of the other calcination steps and which is within the range of from about 700° to about 900° F., thereafter compositing a cobalt compound with said calcined composite, and calcining the resultant composite at a temperature which is higher than the second calcination temperature but lower than the first calcination temperature and which is within the range of from about 1075° to about 1200° F.

13. The process of claim 12 further characterized in that said catalyst is subjected to a sulfidation treatment prior to use in said process.

14. A process for the treatment of a hydrocarbon distillate to remove sulfur and nitrogen contaminants therefrom which comprises contacting said distillate with hydrogen at a temperature of from about 500° to about 800° F. with a catalyst prepared by calcining alumina particles in a first calcination step at a temperature which is higher than used in either of the two subsequent calcination steps hereinafter set forth and which is within the range of from at least 1150° to about 1400° F., compositing a molybdenum compound with the thus calcined alumina particles, calcining the resultant composite in a second calcination step at a temperature which is lower than either of the other calcination steps and which is within the range of from about 700° to about 900° F., thereafter compositing a nickel compound with said calcined composite, and calcining the resultant composite at a temperature which is higher than the second calcination temperature but lower than the first calcination temperature and which is within the range of from about 1075° to about 1200° F.

15. The process of claim 14 further characterized in that said catalyst is subjected to a sulfidation treatment prior to use in said process.

References Cited in the file of this patent

UNITED STATES PATENTS

| | | |
|---|---|---|
| 2,253,308 | Rosen | Aug. 19, 1941 |
| 2,398,175 | Cole | Apr. 9, 1946 |
| 2,440,236 | Stirton | Apr. 7, 1948 |
| 2,547,380 | Fleck et al. | Apr. 3, 1951 |
| 2,687,370 | Hendricks | Aug. 24, 1954 |
| 2,728,710 | Hendricks | Dec. 27, 1955 |
| 2,760,907 | Attane et al. | Aug. 28, 1956 |